United States Patent Office 3,210,099
Patented Oct. 5, 1965

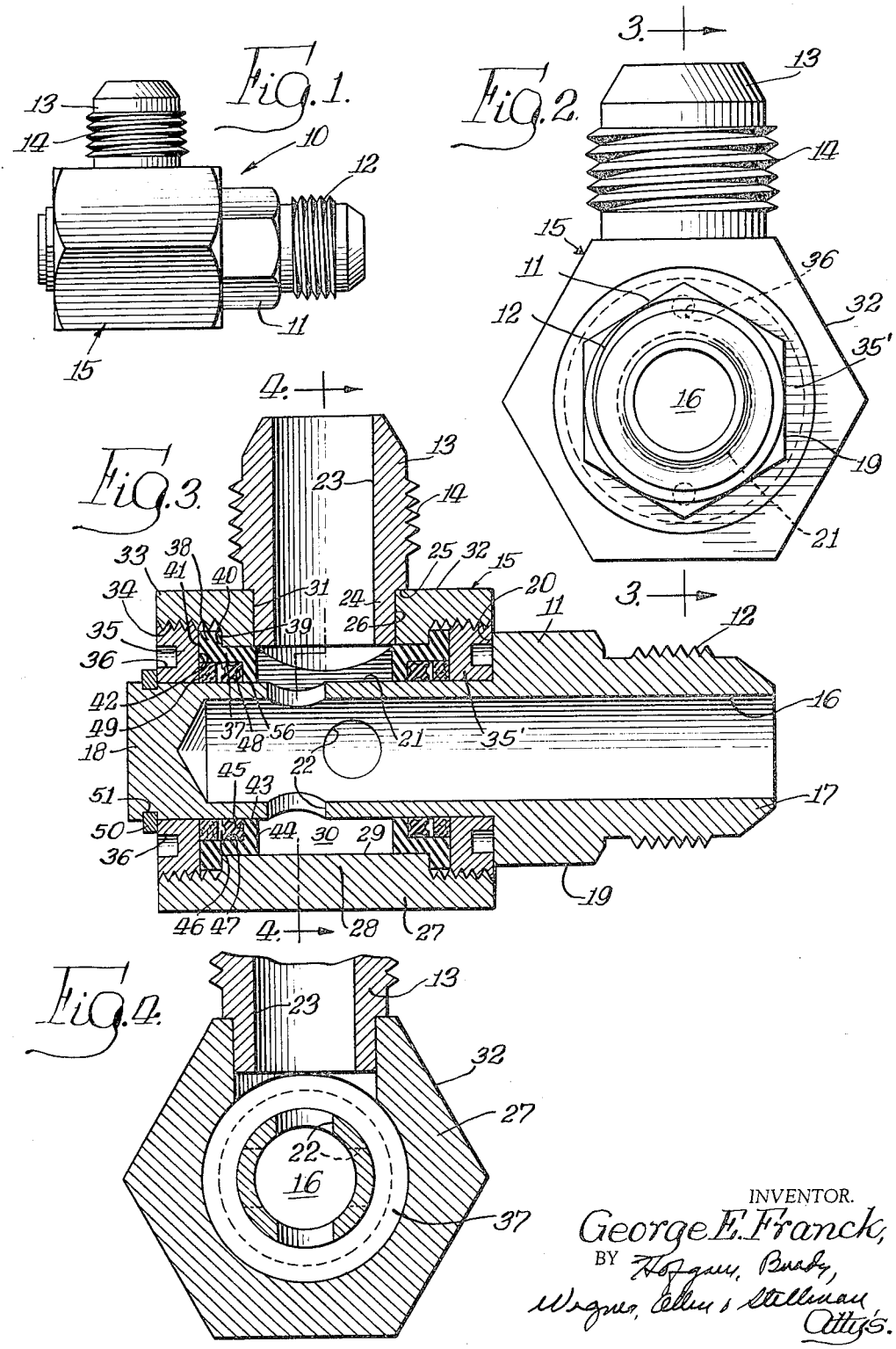

3,210,099
SWIVEL JOINT
George E. Franck, Morton Grove, Ill., assignor to Imperial-Eastman Corporation, a corporation of Illinois
Filed Apr. 25, 1962, Ser. No. 190,113
2 Claims. (Cl. 285—190)

This invention relates to fittings and in particular to swivel connection fittings.

In one form of swivel fitting, a tubular body is provided with a bore opening through one end thereof and one or more radially opening ports adjacent the inner end of the bore. Means for swivelly connecting a conduit or the like to the tubular member are provided in the form of an externally threaded element and means sealingly connecting the tubular element to the body member to extend radially therefrom in any one of a plurality of positions spaced angularly circumferentially around the tubular body in alignment with the ports at the inner end of the recess. The present invention comprehends a new and improved swivel fitting having new and improved means for connecting the tubular element to the body member.

Thus, a principal object of the invention is the provision of a new and improved swivel fitting.

Another object of the invention is the provision of such a fitting having a new and improved means for sealingly connecting a tubular element of the fitting to a body member thereof.

A further object of the invention is the provision of such a fitting which is simple and economical of construction and which provides long maintenance-free life.

Other features and advantages of the invention will be apparent from the following description taken in connection with the accompanying drawings wherein:

FIGURE 1 is a front elevation of a swivel fitting embodying the invention;

FIGURE 2 is an enlarged end elevation thereof;

FIGURE 3 is a diametric section thereof taken substantially along the line 3—3 of FIGURE 2; and FIGURE 4 is a fragmentary transverse section thereof taken substantially along the line 4—4 of FIGURE 3.

In the exemplary embodiment of the invention as disclosed in the drawing, a swivel fitting generally designated 10 is shown to comprise a body member 11 having threaded connecting means 12 and a tubular element 13 having a threaded connecting means 14. As best seen in FIGURE 3, the tubular element 13 is swivelly connected to the body member 11 by means of a connector generally designated 15 whereby the tubular element is arranged to extend sealingly from the body member 11 in any one of a plurality of radial dispositions circumferentially about the axis of the body member 11.

More specifically, body member 11 comprises a rigid elongated member having an elongated cylindrical recess 16 opening axially through one end 17 thereof, the opposite end 18 of the body member being closed. Threaded means 12 comprises an external thread coaxially on the body member adjacent end 17. The body member is further provided with a plurality of flats 19 adjacent the threaded portion 12 for engagement by a suitable tool, such as a wrench or the like, as during the make-up of the fitting. The outside diameter of the body member is reduced between end 18 and the portion provided with flats 19 thereby defining an annular radial shoulder 20 adjacent flats 19 and a cylindrical surface 21 extending from shoulder 20 to end 18. Communication between recess 16 and the space circumjacent surface 21 is provided by means of a port 22 opening radially through the wall of the body member. As illustrated, the ports may be provided as diametric pairs, one pair being longitudinally offset from the other pair.

Tubular element 13 comprises a short rigid member having a through bore 23 opening axially through the opposite ends thereof. Connecting means 14 comprises an external thread generally similar to thread 12 of the body member. The inner end 24 of the tubular element is exteriorly reduced to define an annular radial shoulder 25 and a cylindrical external surface 26 extending to the inner end of the tubular element.

Connector 15 includes a rigid annular collar 27 having a cylindrical mid-portion 28 defining a cylindrical inner surface 29 having a diameter substantially larger than the diameter of body surface 21 and defining therewith an annular space 30 with which ports 22 communicate. The thickness of collar portion 28 is substantially equal to the lengths of surface 26 of tubular element 13 and the collar is provided with a radial opening 31 in which the end portion 24 of tubular element 13 is fixedly secured, as by hydrogen brazing, with the radial shoulder 25 of the tubular element 13 abutting the outer surface 32 of the collar.

The axially opposite halves of the connector 15, that is the portions of the connector 15 at the opposite sides of a central plane perpendicular to the axis thereof, are allochirally similar. Thus, the following description will be limited to the left-hand portion only, it being understood that the right-hand portion is allochirally identical thereto. More specifically, the end portion 33 of the collar 27 is internally threaded at 34, threadedly receiving an annular retainer 35 having an internal diameter substantially equal to the diameter of surface 21 of the body member 11. The retainer is provided with a pair of diametrically opposite, axially outwardly opening recesses 36 for engagement by a suitable spanner wrench or the like for use in installing the retainer in the threaded portion 34 of the collar.

Inwardly of the retainer is disposed a Z-shaped sleeve 37 formed of a material such as plastic. The outer end 38 of the sleeve 37 is outturned to define a radial inner shoulder 39 abutting outwardly facing radial shoulder 40 of the collar 27. The sleeve end 38 further defines a radial outer surface 41 abutting the radial inner surface 42 of the retainer 35.

The inner end 43 of the sleeve 37 is inturned and defines an axially inner surface 44 confronting the space 30, and an axially outer surface 45. The radially inner surface 56 of the end 43 has a diameter substantially equal to the diameter of surface 21 of the tubular member 11.

An annular space 46 is defined by the surface 45 of sleeve end 43, the surface 21 of body member 11, the surface 42 of retainer 35, and the radially inner surface 47 of the sleeve longitudinally outwardly of end portion 43. In this space 46 is received a first resilient sealing ring 48 adjacent the surface 45, and a dust seal ring 49 formed of a material such as leather adjacent the surface 42.

The connector 15 is installed concentrically about the surface 21 of the body member 11 by longitudinal movement of the connector thereover from end portion 18 of the body member. As shown in FIGURE 3, when so installed in the body member the inner retainer 35' abuts the shoulder 20 of the body member. The connector is retained against axial movement on the body member by suitable means such as split ring 50 received in annular groove 51 concentrically in body end portion 18. The internal diameter of the connector 35 is preferably substantially equal to the diameter of body member surface 21 and thus the connector 15 is swivelly mounted on the body member with the connectors 35 (35') rotatably supporting the connector thereon. As shown in FIGURE 3, the shoulder 20 is located so as to dispose the tubular element 13 in alignment with the ports 22 for facilitated fluid flow between bore 16 of the body member 11 and bore 23 of the tubular element 13.

The improved seal provided in connector 15 assures a positive seal of the tubular element 13 to the body member 11 while permitting facilitated selective angular positioning of the tubular element about the axis of the body member. The sealing means is readily installed in the connector by placement of the sleeve 37 firstly in the collar 27 prior to the installation of the connector on the body member. The O-ring 48 and dust seal 49 are then installed in the space 46 and retained therein by threaded engagement of the retainer 35 with the collar portion 34. This assembly is effected at each end of the collar 27. The retainers 35 (35') are suitably adjusted to retain the sealing means positively within the collar 27 as shown in FIGURE 3. The connector assembly is then installed on the body member and retained in place thereon by means of the split ring 50 as shown in FIGURE 3. Suitable connections to the fitting 10 may then be effected by threaded engagement with the threaded portions 12 and 14 thereof to complete the installation of the fitting in an associated fluid system (not shown).

Disassembly of the fitting, as for maintenance purposes, is readily effected by the simple removal of the retaining ring 50 whereby the connector and the attached tubular element 13 may be removed from association with the body member 11 for facilitated accessibility to all portions thereof.

While I have shown and described one embodiment of my invention, it is to be understood that it is capable of many modifications. Changes, therefore, in the construction and arrangement may be made without departing from the spirit and scope of the invention as defined in the appended claims.

I claim:
1. A swivel fitting comprising: a body having a tubular portion provided with a radially opening port; means on said body defining first and second annular radial confronting shoulders spaced oppositely longitudinally from said port; a tubular connector concentrically about said tubular body portion and having a mid-portion provided with an opening and oppositely extending end portions, each of said end portions having an internal diameter greater than said mid-portion to define first and second annular radial shoulders facing away from each other and respectively toward the planes of said first and second shoulders of the body; first and second annular sleeves concentrically about said tubular body portion, said first sleeve having a first radially outturned end portion defining an annular radial shoulder facially engaging said first radial shoulder of the connector, a mid-portion radially within said mid-portion of the connector, a second radially inturned end portion extending to adjacent the outer surface of said tubular body portion spaced longitudinally from said port, said mid-portion of the sleeve and second radially inturned end portion of the sleeve defining an annular recess opening radially inwardly and longitudinally toward said first annular shoulder on the body, said second sleeve having a first radially outturned end portion defining an annular radial shoulder facially engaging said second radial shoulder of the connector, a mid-portion radially within said mid-portion of the connector, a second radially inturned end portion extending to adjacent the outer surface of said tubular body portion spaced longitudinally of said port oppositely to said second end portion of the first sleeve, said mid-portion of the second sleeve and said second radially inturned end portion of the second sleeve defining an annular recess opening radially inwardly and longitudinally toward said second annular shoulder on the body; retainer means including a first annular retainer concentrically rotatably journalled on said tubular portion between said first sleeve and said first annular shoulder of the body and extending across said recess of the first sleeve, said retainer being threadedly secured to said tubular connector within said end portion thereof and having a radial surface engaging and forcing said first end portion of said first sleeve into sealing engagement with said first radial shoulder of the connector, and a second annular retainer concentrically rotatably carried on said tubular portion between said second sleeve and said second annular shoulder of the body and extending across said recess of the second sleeve; and means for sealing said tubular connector swivelly to said tubular portion including a first resilient ring coaxially disposed in said recess of the first sleeve, and a second resilient ring coaxially disposed in said recess of the second sleeve.

2. The swivel fitting of claim 1 wherein said first resilient ring is disposed adjacent said second inturned end of said first sleeve, said second resilient ring is dispoed adjacent said second inturned end of said second sleeve, a first dust seal ring is disposed in said annular recess within said first sleeve adjacent said first annular retainer, and a second dust seal ring is disposed in said annular recess within said second sleeve adjacent said second annular retainer.

References Cited by the Examiner

UNITED STATES PATENTS

| | | | |
|---|---|---|---|
| 424,501 | 4/90 | Reynolds | 285—281 X |
| 2,575,938 | 11/51 | Brenneke | 285—190 X |
| 2,635,931 | 4/53 | May | 285—190 X |
| 2,781,055 | 2/57 | Jackson | 285—281 X |
| 2,810,592 | 10/57 | Williams | 285—351 X |
| 2,927,804 | 3/60 | Snyder | 285—276 X |
| 3,088,759 | 5/63 | Corsette | 285—190 |

FOREIGN PATENTS

| | | |
|---|---|---|
| 738 | 1905 | Great Britain. |
| 217,062 | 6/24 | Great Britain. |

CARL W. TOMLIN, *Primary Examiner.*